Aug. 22, 1961     C. F. KRAMER     2,997,334
VEHICLE BODY WINDOW GLASS FRAME STRUCTURE
Filed June 29, 1959     2 Sheets-Sheet 1

CLARENCE F. KRAMER
INVENTOR.

BY John L. Faulkner
John J. Roethel

ATTORNEYS

Aug. 22, 1961 C. F. KRAMER 2,997,334
VEHICLE BODY WINDOW GLASS FRAME STRUCTURE
Filed June 29, 1959 2 Sheets-Sheet 2
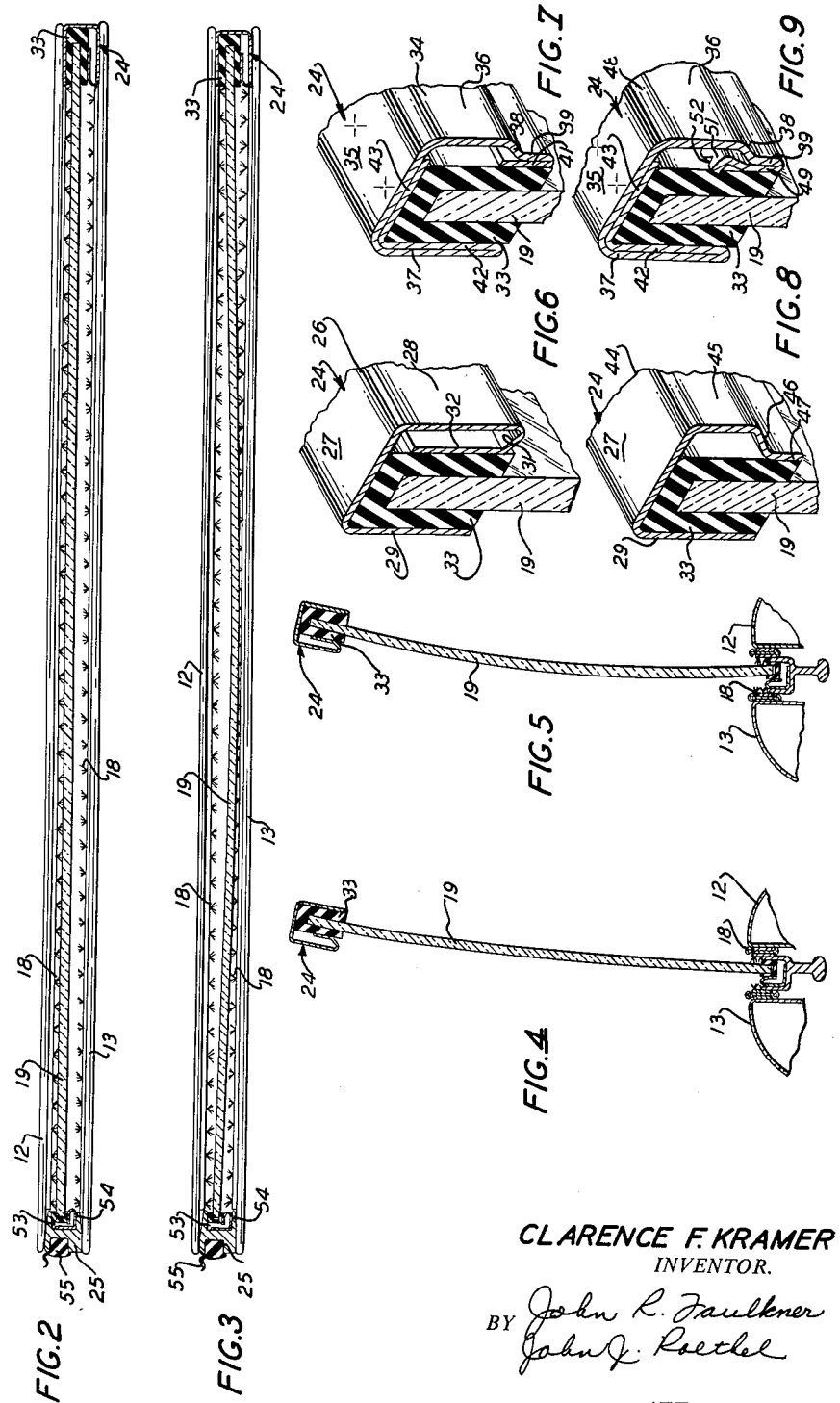
CLARENCE F. KRAMER
INVENTOR.
BY John R. Faulkner
John J. Roethel
ATTORNEYS

United States Patent Office 2,997,334
Patented Aug. 22, 1961

2,997,334
VEHICLE BODY WINDOW GLASS FRAME STRUCTURE
Clarence F. Kramer, Birmingham, Mich., assignor to Ford Motor Company, Dearborn, Mich., a corporation of Delaware
Filed June 29, 1959, Ser. No. 823,433
6 Claims. (Cl. 296—44.5)

This invention relates to a vehicle body window glass frame structure.

More particularly, the present invention relates to a unique window glass frame for a vehicle body provided with side window glass having a compound curvature. The frame is adapted to accommodate the manufacturing variables inherent in curved side window glass as manufactured under current manufacturing processes.

Glass bending techniques or processes, as currently known and applied to the manufacture of curved side glass for vehicle bodies, are incapable of producing a glass having curvature only in a single direction. For example, as heat is applied to a glass sheet to obtain a desired curvature through a vertical section, an undesirable sag condition or curvature is produced through a horizontal section approximately midway of the height of the glass, thereby creating a compound surface curvature. The compound surface curvature creates framing and installation difficulties, it being an object of the present invention to minimize these difficulties.

The side window glass frame embodying the present invention is structurally of a generally U-shaped cross section. The frame is so constructed and arranged that it will, when assembled to the glass perimeter, retain the glass in a position sufficiently inboard of the extreme outer point of the compound surface of the glass to permit the latter to be raised or lowered into vehicle body or door cavities between the inner and outer panels thereof, the glass being lowered or raised through a slot having inner and outer parallel side edges or walls. During the raising and lowering movements, the inner and outer legs of the frame contact the parallel slot edges or walls to maintain lateral stability of the glass. Another feature of the present invention is related to having one leg of the U-shaped frame constructed and arranged so that it will be resilient to the extent necessary to accommodate irregularities and waves in the edge surfaces of a curved window glass. The irregularities and waves are the result of the application of heat to the window glass as it is being formed. Other objects and advantages of this invention will be made more apparent as the description proceeds, particularly when considered in connection with the accompanying drawings, wherein:

FIG. 2 is a cross sectional view taken substantially through the line 2—2 of FIG. 1 looking in the direction of the arrows and illustrating the normal relationship to the parallel edges of the window well slot of a window glass having a true curvature in a horizontal direction;

FIG. 3 is a view in part similar to FIG. 2 illustrating the relationship to the window well slot edges of a window glass having an undesirable sag in a horizontal direction;

FIG. 4 is a sectional view taken substantially through line 4—4 of FIG. 1 looking in the direction of the arrows and illustrating the appearance of a window glass having a true curve in a vertical direction;

FIG. 5 is a view in part similar to FIG. 4 illustrating the appearance of a glass having an extreme sag in a vertical direction;

FIG. 6 is an enlarged view of the portion of FIG. 1 within the circle 6 illustrating one embodiment of the window frame cross section structure; and FIGS. 7, 8 and 9 are enlarged views in part similar to FIG. 6 illustrating other embodiments of the window frame cross section structure.

Figure 1:
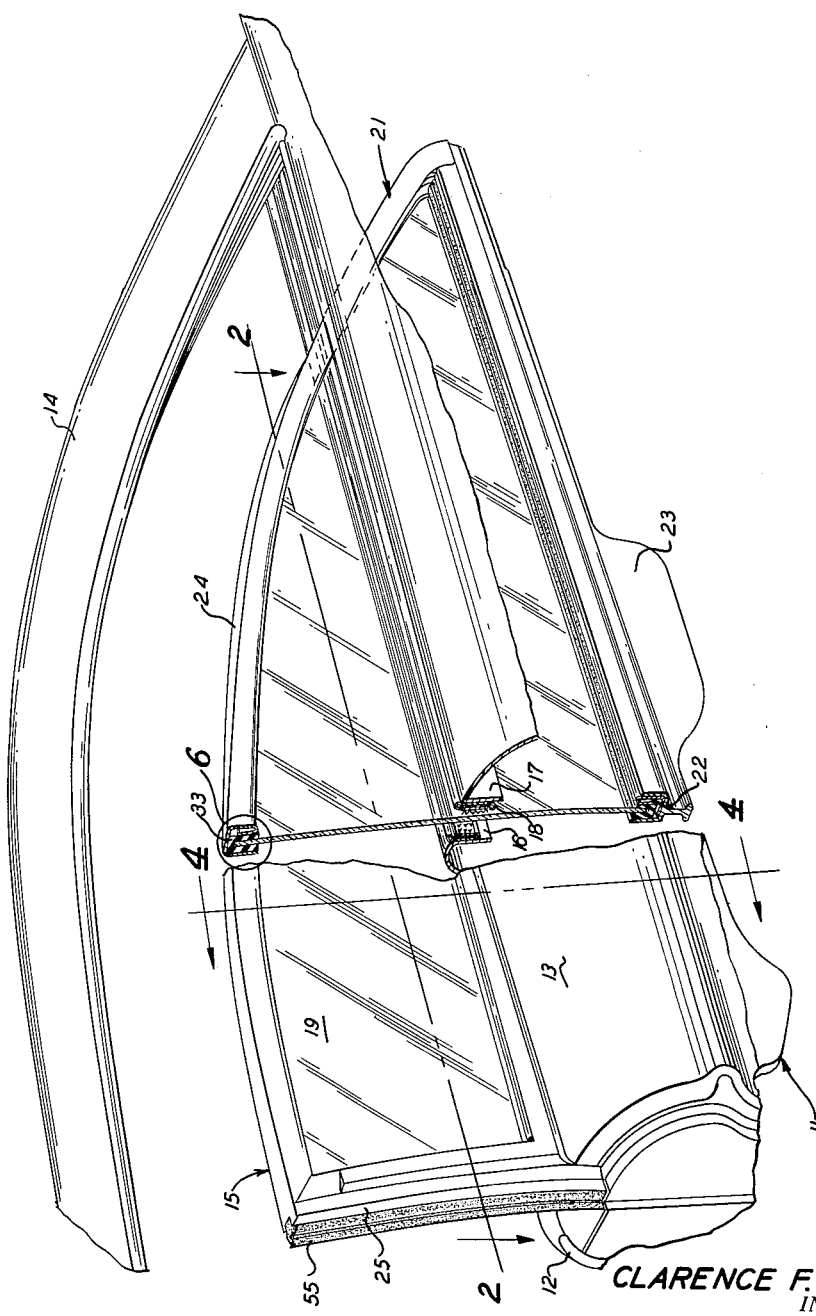
FIG. 1 is a perspective view, in part fragmentary, illustrating the vehicle body window glass frame structure embodying the present invention in operative relation to a vehicle body.

Referring now to the drawings, there is illustrated in FIG. 1 a typical body section, generally designated 11, such as a rear quarter section of a two door hardtop model. The body section 11 has an inner panel 12 and an outer panel 13. A section 14 of the roof rail of the vehicle body is also illustrated. It will be understood that this description, in general, also applies to a typical vehicle door, although the door may or may not be provided with a window opening framing member corresponding to the roof rail section 14.

As in conventional practice, the inner and outer panels 12 and 13, respectively, have a substantial space therebetween which provides a body cavity or window well into which the movable window, generally designated 15, may be retracted. The window operating mechanism, the vertical guide channels, and the various brackets and support braces or the like related to the window operating and guiding devices, none of which are shown, are housed within the window receiving cavity or window well. Since the characteristics of these devices are not directly related to the present invention, it is believed unnecessary to describe any of their details.

At its upper edge, each of the body or door panels 12 and 13 is provided with a longitudinally extending, downwardly depending flange or lip 16 or 17, respectively. The flanges 16 and 17 are in spaced parallel relationship to each other and form an elongated slot through which the window 15 may be raised or lowered with respect to the body or door cavity or window well.

The face of each flange 16 or 17 may be covered with a conventional weather strip assembly 18 commonly known as "Schlegel" cloth. "Schlegel" cloth is a common form of weather stripping comprising a rubber coated metal backing strip covered with a cloth having a resilient pile surface on the one face thereof, as best seen in FIGS. 2 to 4, inclusive. Suitable clip devices, not shown, snap-fasten the weather strip assembly to the flanges 16 and 17 so that the resilient pile surface may cushion the window passing therebetween.

As illustrated, the peripheral normally exposed edges of the window glass 19 are inclosed in a frame structure, generally designated 21. The lower edge of the glass 19 is suitably cushioned and seated in an upwardly opening elongated slot 22 in the channel member 23 to which the window raising and lowering mechanism (not shown) is coupled. The side and top edges of the glass are incased by frame sections 24 and 25, the features of which embody the present invention.

In a conventional vehicle body window installation, the frame surrounding the window would be provided with a cross sectional thickness of sufficient dimension to accommodate the thickness of the vehicle glass plus the thickness of a suitable rubber cushioning strip covering the edge of the glass. The slot or opening between the panel flanges 16 and 17 also would be of just sufficient width to accommodate the frame thickness and the weather strip assemblies, if provided, cushioning the window on each side. Such dimensional relationship provides no difficulties with vehicle windows made of flat glass. However, as explained in the statement of the problem which the present invention is intended to solve, the vehicle glass which is now being used is curved in at least one direction. FIG. 1, illustrates a window glass having a curvature in a single direction through a vertical section. This may be more plainly seen in FIG. 4, in which the glass 19 is illustrated as it would appear if the process for curving the glass could be controlled so that the result would be exactly to a true or designed curvature. FIG. 2 illustrates a cross section through a horizontal plane of the glass as it should appear if the bending or curving technique could be exactly controlled. As was explained, glass bending techniques or processes as currently practiced cannot be controlled to produce a glass having curvature only in a single direction. For example, as heat is applied to a glass sheet to obtain a desired curvature through a vertical section, as illustrated in FIG. 4, an undesirable sag condition is produced through a horizontal section approximately midway of the height of the glass resulting in a condition as illustrated in FIG. 3. The horizontal sag developed results in a distortion of the vertical section producing the result illustrated in FIG. 5. Accordingly, if this glass were to be installed in a vehicle body provided with inner and outer panels having flanges 16 and 17 spaced in accordance with conventional practice, that is, in which the flanges 16 and 17 are spaced to provide a slot adapted to receive the cumulative width or thickness of the glass, the rubber cushioning strips, the glass frame and the weather strip assemblies, difficulties would be encountered because the effective width of the glass caused by the deviation from true curvature frequently would be dimensionally greater than the cumulative dimensions of the various items listed. The glass could not then be lowered or raised through the slot into or out of the body cavity or window well.

The present invention overcomes this difficulty by providing a slot, as defined by the flanges 16 and 17 of the body panels 12 and 13, the width of which is somewhat greater than normally found in a conventional vehicle body. The enlarged slot accommodates the frame structure 21 embodied in the present invention. The frame structure 21 is constructed and arranged so that it will assemble to the glass perimeter and retain the glass in a position sufficiently inboard of the extreme outer point on the compound surface of the glass to permit lowering of the glass through the slot between the inner and outer parallel flanges 16 and 17 into the door or body cavities or window wells. The frame inner and outer legs, to be hereinafter identified, contact the parallel sides or flanges 16 and 17 of the door or body cavities or window wells as the glass is lowered or raised into position, thereby maintaining lateral stability of the glass.

The enlarged slot provided to accommodate the curved window glass 19 requires a frame structure 21 having greater than normal cross sectional width, particularly across its transverse section 23. The increased width necessarily must be obtained without any loss of rigidity even though sheet metal frame stock of a conventional metal thickness or a gauge must be used to avoid extensive alterations to the channel forming or rolling machines. The increased width must necessarily be accomplished at a minimum cost differential over conventional frame or channel sections. In FIGS. 6 to 9, inclusive, there are illustrated four forms of the frame structure 21 or, more particularly, of the frame section 24, embodying the present invention.

In the embodiment of FIG. 6, the frame section 24 comprises an inverted U-shaped channel member 26 having a base portion 27 and vertically depending, spaced parallel outer and inner leg portions 28 and 29. The lower edge of the outer leg portion 28 terminates in an inwardly turned flange 31. The latter being upwardly inclined at a slight angle. At its inner edge, the flange 31 is provided with an upwardly extending extension or secondary flange 32 which parallels the inner leg portion 28 in spaced relationship thereto.

As shown in FIG. 6, the peripheral edge of the glass is covered with a U-shaped rubber cushion member 33. The cushion member 33 is covered by the channel member 26. The width of the cushion member 33 is slightly greater than the opening between the outer leg 29 and the flange extension 32. The rubber cushion member is slightly compressed upon the frame section channel member 26 being forced down over it.

The embodiment of the frame section 24 illustrated in FIG. 7 comprises an inverted substantially U-shaped channel member 34 having a base portion 35 and vertically depending, spaced outer and inner leg portions 36 and 37. The outer leg portion 36 is provided near its lower end with an inwardly inclined, downwardly extending section 38 terminating in a vertically depending section 39. The material from which the channel member 34 is formed, generally metal, is folded over to provide a short upwardly extending section 41 lying in face to face contact with the inner side of the channel section 39. Thus, the cross section through the base 37 and its inner is of double material thickness.

It will be noted that the material from which the channel member 34 is made is folded over at 42 inside of the inner leg 37 to provide a double material thickness through this cross section. The folded or doubled over material is carried around the corner of the base 35 and the leg portion 37 so as to provide an inner base layer 43 in face to face contact with the inner side of the base 35. Thus, the cross section through the base 37 and its inner layer 43 is of double material thickness, the two layers of material preferably being spot welded together. The inner layer 43 terminates short of the corner or intersection of the base 35 and outer leg 36.

In the embodiment of FIG. 8, the channel member, herein designated 44, is provided with a base section and an inner leg section corresponding to the base section 27 and the inner leg section 29, respectively, of the embodiment illustrated in FIG. 6. In this embodiment, the outer leg comprises a vertically depending section 45 having an inwardly inclined, downwardly depending section 46 which terminates in a vertically depending section 47, the plane of which parallels the plane of the section 45. It will thus be noted that the outer contour of the channel member 44 has substantially the same appearance as the outer contour of the channel member 34 of the FIG. 7 embodiment, but that the channel member 44 is of single material thickness throughout.

In the embodiment of FIG. 9, the channel member, herein designated 48, is substantially the same as the channel member 34 of the FIG. 7 embodiment. In this embodiment, the material from which the outer leg portion 36 is formed is doubled over at the bottom edge thereof to provide an upwardly extending section in face to face relationship with the inner face of the lower section 39 of the leg portion. However, instead of terminating in a straight edge as did the inner layer material 41 of the FIG. 7 embodiment, the inner layer of material 49 of the present embodiment is creased to form a section 51 which angles outwardly toward the leg section 36 and then back inwardly. The edge of the section 51 is notched or serrated at 52 to provide teeth adapted to engage the rubber cushioning strip 33 surrounding the peripheral edge of the glass.

To complete the description of the present invention, brief mention may be made of the characteristics of the frame section 25. The frame section 25 is of a width equal to the width of the frame section 24 and has an enlarged slot 53 therein adapted to receive the glass and a retainer or spacer element 54. In the illustrated embodiment the frame section 25 is illustrated as carrying a rubber sealing strip 55 at its forward edge, since the portion of the vehicle body illustrated is that of a hardtop model or one in which there is no pillar between the body section and the door. The rubber sealing strip, therefore, is provided to close the gap between the window of the door and the window of the body.

All four of the embodiments of the frame section 24 illustrated in FIGS. 6 to 9, inclusive, have certain important features in common. Each of the channel members 26, 34, 44 and 48, comprising the various embodiments of the frame section 23, are of an internal diameter somewhat wider than the cumulative width of the glass 19 and the rubber cushioning member 33 covering the glass. This results in an unoccupied space in each channel member. Because of the construction and arrangement of the outer depending leg portion of each channel member, the unoccupied space is within the outer upper corner of the channel member. As the vehicle window 15 is raised or lowered through the slot between the flanges 16 and 17, there is a tendency for the glass 19 to attempt to straighten up relative to the frame 21. The upper outer peripheral edge of the glass tends to force the rubber cushion member 33 outwardly or into the unoccupied space within the channel member forming the frame section 24. It would be readily apparent that if the cushion member 33 were in abutting relation to a channel member wall, the limit of compressibility of the cushion might be reached before all possible side movement of the glass had been taken up. Under extremely adverse conditions, lateral strain sufficient to crack the glass may result.

It may be noted that in the FIG. 6 embodiment the inner leg 32 extends relatively close to the base 27. However, this leg section is more or less hinged by the section 31 to the depending leg portion 28, providing the necessary resiliency.

The space within the upper outer corner of each of the illustrated channel members provides relief or freedom from compression of the rubber cushioning member 33 resulting from irregularities or waves in the edge of the glass occurring during the application of heat to the glass to form the desired curvature therein.

Although it may not be technically feasible to curve a sheet of glass to a desired degree of curvature in one direction without creating an undesired sag or curvature in a transverse direction, it is believed readily apparent that it would not be difficult to determine, even if it is done empirically or by trial and error, the extent or degree of sag occurring. It then becomes a simple matter to design a frame section embodying the principles of the present invention. Such a frame section, when assembled to the glass perimeter, will retain the glass in a position sufficiently inboard of the extreme outer point on the compound surface to permit lowering of the glass between the edges of the slot. As the glass is lowered or raised the outer and inner legs of the frame contact the weather strip covered slot flanges thereby maintaining lateral stability of the glass.

It will be understod that the invention is not to be limited to the exact construction shown and described, but that various changes and modifications may be made without departing from the spirit and scope of the invention as defined in the appended claims.

What is claimed is:

1. In combination, a curved window glass adapted to be raised or lowered relative to a window opening, said window glass having a predetermined curvature through its vertical section and a sag through its horizontal section, said sag reaching a maximum approximately midway of the height of the glass, cushioning means encompassing a peripheral edge of said glass, and a frame structure comprising a substantially U-shaped channel member having a base portion and vertically extending leg portions at each edge thereof, means on at least one of said leg portions effective to maintain the latter in spaced relationship to the adjacent edge of said glass, the outer width of said channel member across said leg portions being such that the glass is retained in a position sufficiently inboard of the extreme outer point of sag on the curved surface thereof to permit lowering or raising movements of the glass through a body structure defining said window opening without interference at said extreme outer point of sag, said frame structure in engagement with said body structure maintaining the lateral stability of said glass during said movements.

2. In a vehicle body having a window opening and spaced inner and outer body panels defining a window well beneath said window opening, access to said window well being through an elongated opening formed by opposed, parallel edges of said spaced panels, a curved window glass adapted to be raised and lowered through said elongated opening, said window glass having a predetermined curvature through its vertical section, the creation of said predetermined curvature resulting in a second curvature through its horizontal section, said second curvature reaching a maximum approximately midway of the height of the glass, and a frame structure assembled to the peripheral edge of said window glass, said frame structure being constructed and arranged to contact said elongated opening edges to maintain the window glass in a position sufficiently inboard of the extreme outer point of said second curvature thereof to permit the glass to be raised or lowered without contacting the elongated opening edges.

3. In a vehicle body having a window opening and spaced inner and outer body panels defining a window well beneath said window opening, access to said window well being through an elongated slot formed by the opposed, parallel edges of said spaced panels, a curved window glass adapted to be raised and lowered through said slot, said window glass having a predetermined curvature through its vertical section, the creation of said predetermined curvature resulting in a second curvature through its horizontal section, said second curvature reaching a maximum approximately midway of the height of the glass, and a frame structure assembled to the peripheral edge of said window glass, said frame structure comprising a substantially U-shaped channel member having a base portion and vertically extending leg portions at each edge thereof, means on at least one of said leg portions effective to space the latter relative to the adjacent edge of said glass, the outer width of said channel member across said leg portions being such that said leg portions contact said slot edges while maintaining the window glass in a position sufficiently inboard of the extreme outer point of said second curvature thereof to permit the glass to be raised or lowered without contacting the slot edges.

4. In a vehicle body having a window opening and spaced inner and outer body panels defining a window well beneath said window opening, access to said window well being through an elongated slot formed by the opposed, parallel edges of said spaced panels, a curved window glass adapted to be raised and lowered through said slot, said window glass having a predetermined curvature through its vertical section, the creation of said predetermined curvature resulting in a second curvature through its horizontal section, said second curvature reaching a maximum approximately midway of the height of the glass, and a frame structure assembled to the peripheral edge of said window glas, said frame structure comprising a substantially U-shaped channel member having a base portion and vertically extending leg portions at each edge thereof, means on at least one of said leg portions effective to space the latter relative to the adjacent edge of said glass, the outer width of said channel member across said leg portions being such that said leg portions contact said slot edges while maintaining the window glass in a position sufficiently inboard of the extreme outer point of said second curvature thereof to permit the window glass to be raised or lowered without contacting the slot edges, the relative position of said means to said one leg portion providing a relief space within the corner defined by said base portion and said one leg portion when said channel member is positioned over the peripheral edge of said window glass.

5. In a frame structure adapted to fit over the peripheral edge of a vehicle window glass, said window glass having a predetermined curvature through its vertical section, the creation of said predetermined curvature resulting in a second curvature through its horizontal section, said second curvature reaching a maximum approximately midway of the height of the glass, a substantially U-shaped channel member having a base portion and vertically extending leg portions at each edge thereof, at least one of said leg portions being provided with a section lying in a first plane passing through the intersection of said base portion and said one leg portion, said one leg portion having an extension thereof lying in a plane paralleling said first plane and intermediate said leg portions, the terminal edge of said extension being spaced from said base portion, said section being maintained in spaced relationship to said glass when said channel member is positioned over a window glass edge, said spaced relationship providing a relief space to accommodate edge movement of said window glass and surface irregularities on the peripheral edge thereof.

6. In a frame structure adapted to fit over the peripheral edge of a vehicle window glass, said window glass having a predetermined curvature through its vertical section, the creation of said predetermined curvature resulting in a second curvature through its horizontal section, said second curvature reaching a maximum approximately midway of the height of the glass, a substantially U-shaped channel member having a base portion and vertically extending leg portions at each edge thereof, at least one of said leg portions being provided with a section lying in a first plane passing through the intersection of said base portion and said one leg portion, said one leg portion having an integral extension turned toward said base portion and lying in a plane paralleling said first plane and intermediate said leg portions, said section being maintained by said extension in spaced relationship to said glass when said channel member is positioned over a window glass edge, the terminal edge of said extension being spaced from said base portion, said spaced relationship providing a relief space within the corner of said channel member to accommodate edge movement of said window glass or surface irregularities in the peripheral edge thereof.

References Cited in the file of this patent

UNITED STATES PATENTS

| | | |
|---|---|---|
| 1,701,969 | Brazell | Feb. 12, 1929 |
| 2,120,359 | Hartmann | June 14, 1938 |
| 2,260,997 | Ledwinka | Oct. 28, 1941 |
| 2,798,761 | Himka | July 9, 1957 |
| 2,844,405 | Roethel | July 22, 1958 |
| 2,912,727 | Sehn | Nov. 17, 1959 |